United States Patent
Pailla et al.

(10) Patent No.: US 11,966,260 B1
(45) Date of Patent: Apr. 23, 2024

(54) ROLLABLE SCREEN SIMULTANEOUS USE

(71) Applicant: Motorola Mobility LLC, Chicago, IL (US)

(72) Inventors: Panduranga Reddy Pailla, Bangalore (IN); Amit Kumar Agrawal, Bangalore (IN); Vijayprakash Bheemsainrao, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/185,945

(22) Filed: Mar. 17, 2023

(51) Int. Cl.
*G06F 1/16* (2006.01)

(52) U.S. Cl.
CPC .......... *G06F 1/1652* (2013.01); *G06F 1/1647* (2013.01); *G06F 1/1692* (2013.01)

(58) Field of Classification Search
CPC .. G06F 3/0412; G06F 3/04817; G06F 3/0483; G06F 3/0488; G06F 2203/04102; G06F 2203/04803; G09G 5/14; G09G 5/373; G09G 5/38; G09G 2340/0442; G09G 2340/0464; G09G 2340/14; G09G 2354/00; G09G 2370/16; G09G 2380/02
See application file for complete search history.

(56) References Cited

U.S. PATENT DOCUMENTS

| | | | | |
|---|---|---|---|---|
| 10,778,821 | B1* | 9/2020 | Yang | H04M 1/0264 |
| 11,003,207 | B2* | 5/2021 | Kim | G06F 1/1686 |
| 11,284,003 | B2* | 3/2022 | Park | G06F 1/1637 |
| 2017/0003756 | A1* | 1/2017 | Gao | G06F 3/147 |
| 2018/0164852 | A1* | 6/2018 | Lim | H04M 1/0214 |

OTHER PUBLICATIONS

Pailla, Panduranga Reddy, et al., "US Application as Filed", U.S. Appl. No. 18/182,473, filed Mar. 13, 2032, 42 pages.

* cited by examiner

*Primary Examiner* — Nelson M Rosario
(74) *Attorney, Agent, or Firm* — FIG. 1 Patents

(57) ABSTRACT

In aspects of rollable screen simultaneous use, a mobile device includes a rollable display screen configurable in one of multiple display states, including a front-facing portion of the rollable display screen and at least one rear-facing portion of the rollable display screen. The mobile device implements a configuration manager that adjusts content displayed for viewing on the front-facing portion of the rollable display screen based at least in part on a touch actuation to a selectable control on the rear-facing portion of the rollable display screen.

20 Claims, 10 Drawing Sheets

ROLLABLE SCREEN SIMULTANEOUS USE

BACKGROUND

Devices such as smart devices, mobile devices (e.g., cellular phones, tablet devices, smartphones), consumer electronics, and the like can be implemented for use in a wide range of environments and for a variety of different applications. Generally, mobile devices come in varying sizes and form factors, such as rectangular with an overall rigid shape, foldable devices with a housing that is hinged allowing a device to fold, and slidable devices with housing sections that slide apart and back together. Consumers typically want smaller devices that are convenient to carry, yet also prefer devices that have some expandability for larger display viewing, such as with the foldable and slidable devices. However, as device form factors become smaller, such as for compact mobile phones that are convenient to carry, viewing content on the display screen can be compromised by content controls and/or display controls that are displayed over the viewable content. For example, gaming controls, content playback controls (e.g., fast-forward, pause, play, etc.), volume adjust, display screen brightness, and the like may be displayed over the content being viewed by a user of a device, which overall, interrupts the user experience.

BRIEF DESCRIPTION OF THE DRAWINGS

Implementations of the techniques for rollable screen simultaneous use are described with reference to the following Figures. The same numbers may be used throughout to reference like features and components shown in the Figures.

DETAILED DESCRIPTION

Figure 1:
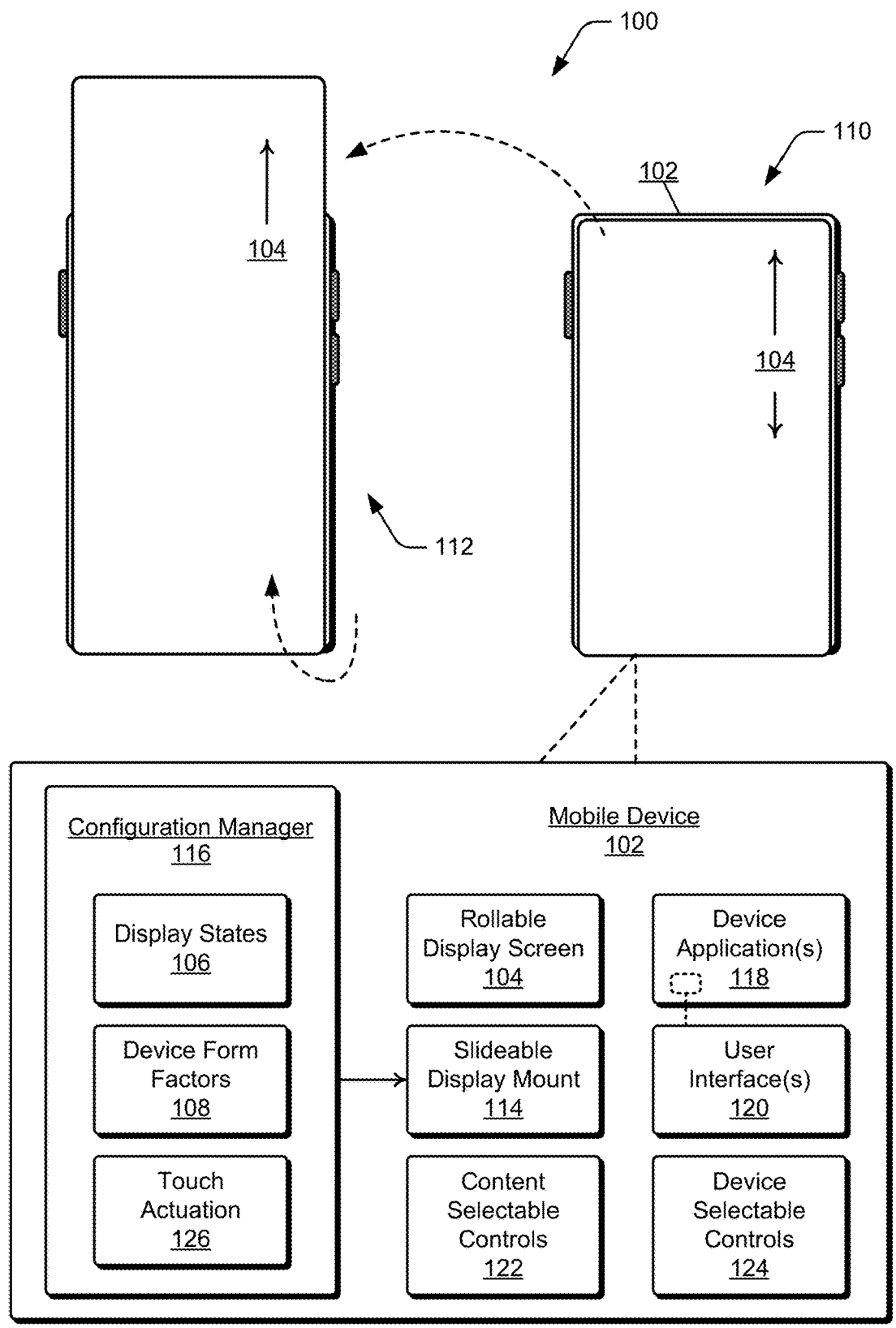
FIG. 1 illustrates an example system for rollable screen simultaneous use in accordance with one or more implementations as described herein.

Implementations of techniques for rollable screen simultaneous use are implemented as described herein, and the techniques apply to any device that is configurable in various form factors, such as any type of extendable device which can change form factors automatically. A rollable screen device, such as a mobile device (e.g., any type of mobile phone, wireless device, and/or electronic device) can include a rollable display screen that can be configured in any one of various display states, which correspond to respective mobile device form factors. For example, device form factors can include a compact form factor, an expanded form factor, a partial form factor (also referred to as a "peek" form factor), as well as other device form factors. The rollable display screen may be positioned in any incremental display state corresponding to device form factors, such as from the partial form factor to the compact form factor, and between the compact form factor and the expanded form factor. The mobile device includes a slidable display mount that is a powered sliding or translation mechanism operable to transition the rollable display screen between the various display states.

In implementations, the rollable display screen has a front-facing portion of the display screen and at least one rear-facing portion of the display screen. In other implementations, the rollable display screen can include a second rear-facing portion. The techniques described herein allow for simultaneous utilization of the front-facing portion that is viewable on a first side of the mobile device and the rear-facing portion is viewable on a second side of the mobile device. The rear-facing portion of the rollable display screen wraps around a first end of mobile device as a continuation of the front-facing portion of the rollable display screen. Further, the rollable display screen can include the second rear-facing portion, and the second rear-facing portion of the rollable display screen wraps around a second end of the mobile device as a further continuation of the front-facing portion of the rollable display screen.

In aspects of rollable screen simultaneous use, a mobile device implements a configuration manager as any type of control unit that manages a configuration of the rollable display screen. The configuration manager can determine (or receive or be provided input) that content is displayed for viewing on the front-facing portion of the rollable display screen, such as any type of media, gaming, image, and/or any other type of viewable and/or interactive content. The configuration manager can initiate, control, and/or mange to move or display selectable controls of the displayed content to a rear-facing portion of the rollable display screen, where a user of the device can actuate to perform a selectable control without needing visual notification of the selectable control.

The configuration manager also receives touch actuations to selectable controls that are displayed on the one or more rear-facing portions of the rollable display screen. For example, selectable controls displayed on the one or more rear-facing portions of the rollable display screen can include a content playback control (e.g., a media playback control, a gaming control), a display control (e.g., a screen brightness control), a device control (e.g., a device volume control, a screen record control), and/or any other type of the many possible content playback controls, display controls, and/or device controls. Notably, a rear-facing portion of the rollable display screen can be utilized for the content and/or display screen operations that can be actuated by a user of the mobile device, where the user does not need to look at or view a selectable control on the rear-facing portion of the display screen to initiate a touch actuation on the selectable control. Device and/or content operations that don't need user visual attention can be performed by touch actuation on the rear-facing portion of the display without looking at the selectable control.

In response to a touch actuation to a selectable control on a rear-facing portion of the rollable display screen, the configuration manager can adjust the content displayed for viewing on the front-facing portion of the rollable display screen. In implementations, playback of the content displayed for viewing on the front-facing portion of the rollable display screen is adjusted based on the touch actuation of the content playback control on a rear-facing portion of the rollable display screen. Alternatively, or in addition, an appearance of the front-facing portion of the rollable display screen is adjusted based on the touch actuation of the display control on a rear facing portion of the rollable display screen. For example, a contextual action is implemented by the configuration manager to alter the content displayed for viewing on the front-facing portion of the rollable display screen based on a touch actuation to a selectable control on a rear-facing portion of the rollable display screen. Similarly, a contextual action is implemented by the configuration manager to alter a displayable feature of the front-facing portion of the rollable display screen based on a touch actuation to a selectable control on a rear-facing portion of the rollable display screen.

While features and concepts of the described techniques for rollable screen simultaneous use can be implemented in any number of different devices, systems, environments, and/or configurations, implementations of the techniques for rollable screen simultaneous use are described in the context of the following example devices, systems, and methods.

FIG. 1 illustrates an example system 100 for rollable screen simultaneous use, as described herein. The example system 100 includes a mobile device 102, such as a smartphone, mobile phone, wireless device, and/or any other type of wireless device. The mobile device 102 can be implemented with various components, such as a processor system and memory, as well as any number and combination of different components as further described with reference to the example device shown in FIG. 13. In implementations, the mobile device 102 includes various radios for wireless communication with other devices. For example, the mobile device 102 may include a Bluetooth (BT) and/or Bluetooth Low Energy (BLE) transceiver and/or a near field communication (NFC) transceiver. The mobile device 102 may also include a Wi-Fi radio, a GPS radio, and/or any type of device communication interfaces.

The mobile device 102 has a rollable display screen 104 that can be configured in any one of various display states 106 corresponding to respective mobile device form factors 108. For example, the device form factors 108 can include a compact form factor, an expanded form factor, a partial form factor (also referred to as a "peek" form factor), as well as other device form factors. The rollable display screen 104 may be positioned in any incremental display state 106 corresponding to device form factors between the compact form factor and the expanded form factor. In this example system 100, the mobile device 102 is shown in the compact form factor at 110, with the rollable display screen 104 configured in a retracted display state that corresponds to the compact form factor of the device. Further, the mobile device 102 is shown in the expanded form factor at 112, with the rollable display screen 104 configured in an extended display state. The rollable display screen 104 is a flexible display that translates between the retracted display state to the extended display state, and back. In one or more implementations, the rollable display screen 104 is an organic light emitting diode (OLED) display fabricated on a flexible plastic substrate, which allows the flexible display to deform around the device housing.

In implementations, the rollable display screen has a front-facing portion of the display screen and at least one rear-facing portion of the display screen. In alternate implementations, the rollable display screen 104 wraps around both ends of the device housing of the mobile device 102, and the rollable display screen has a first rear-facing portion and a second rear-facing portion of the display screen, such as shown and described with reference to FIGS. 6-8. A portion of the rollable display screen 104 rotates around the housing of the mobile device 102, such as in the compact form factor of the device, forming a rear-facing portion of the display screen (e.g., relative to the front-facing portion of the display screen shown in the compact form factor at 110 and in the expanded form factor at 112 in the example system 100). In implementations, both the front-facing portion and the one or two rear-facing portions of the rollable display screen 104 can be used to display content, such as related content or content associated with two different applications. In the expanded form factor of the mobile device 102, the rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

The mobile device 102 includes a slidable display mount 114 that is a powered sliding or translation mechanism (e.g., an actuator, motor, gear assembly, drive screws, etc.) operable to transition the rollable display screen 104 around the surfaces of the device housing, such as between the extended display state where the rollable display screen 104 extends distally from the device housing, and the retracted display state where the rollable display screen 104 corresponds to the compact form factor of the device with the flexible display wrapping around the surfaces of the device housing. In one or more implementations, the rollable display screen 104 may be extended or retracted automatically, such as based on whether content is being displayed on the display screen for viewing, a size of the displayed content, and/or based on the type of displayed content. For example, a user may prefer the mobile device 102 in the compact form factor as shown at 110 for ease of carrying, and then when initiating to playback content for viewing, the rollable display screen 104 automatically extends from the retracted display state to the extended display state for full-screen viewing, as shown at 112 in the expanded form factor of the device.

The mobile device 102 includes various functionality that enables the mobile device to implement different aspects of rollable screen simultaneous use, as described herein. In this example system 100, the mobile device 102 includes a configuration manager 116 that represents functionality (e.g., logic, software, and/or hardware) enabling the automatic function control of the slidable display mount 114 for translating and positioning the rollable display screen 104. The configuration manager 116 can be implemented as computer instructions stored on computer-readable storage media (e.g., memory of the device), or in any other suitable memory device or electronic data storage, and can be executed by a processor system of the device. Alternatively or in addition, the configuration manager 116 can be implemented at least partially in firmware and/or at least partially in computer hardware. For example, at least part of the configuration manager 116 may be executable by a computer processor, and/or at least part of the configuration manager may be implemented in logic circuitry. In one or more implementations, the configuration manager 116 may include independent processing, memory, and/or logic components functioning as a computing and/or electronic device integrated with the mobile device 102.

The mobile device 102 can include and implement various device applications 118, such as any type of messaging application, email application, video communication application, cellular communication application, music application, gaming application, media application, social platform applications, and/or any other of the many possible types of device applications. Many of the device applications 118 have an associated application user interface 120 that is generated and displayed for user interaction and viewing, such as on the rollable display screen 104 of the mobile device 102. Generally, an application user interface, or any other type of video, image, graphic, and the like is digital image content that is displayable on the rollable display screen 104 of the mobile device. In this example system 100, the configuration manager 116 can be implemented as a software application or module, such as executable software instructions that are executable with a processor system of the mobile device 102 to implement the techniques and features described herein. As a device application, the configuration manager 116 may have an associated application user interface 120 that is generated and displayable for user interaction and viewing, such as on the rollable display screen 104 of the mobile device.

The rollable display screen 104 can be utilized to display any of various types of content on the mobile device 102. In one or more implementations, the mobile device 102 generates and/or outputs content from a device application 118 and/or operating system of the device, and the content is displayed on the rollable display screen 104. For example, a media application may receive streaming content from a remote server via a communication network for display on the rollable display screen. In this example system 100, the configuration manager 116 can determine (or receive or be provided input) that content is displayed for viewing on the front-facing portion of the rollable display screen 104, such as any type of media, gaming, image, and/or any other type of viewable and/or interactive content. The configuration manager 116 can initiate, control, and/or mange to move or display selectable controls of the displayed content to a rear-facing portion of the rollable display screen, where a user of the device can actuate to perform a selectable control without needing visual notification of the selectable control.

In this example, the mobile device includes content selectable controls 122, which can be actuated by a user of the device to adjust the content displayed for viewing on the front-facing portion of the rollable display screen 104. For example, the content selectable controls displayed on the one or more rear-facing portions of the rollable display screen 104 can include a content playback control, such as a media playback control (e.g., pause, resume, fast-forward, reverse, etc.) or a gaming control (e.g., joysticks, player modes, etc.). In response to receiving a touch actuation 126 to a content selectable control on a rear-facing portion of the rollable display screen, the configuration manager 116 can adjust playback of the content displayed for viewing on the front-facing portion of the rollable display screen 104. The mobile device also includes device selectable controls 124, which can be actuated by a user of the device to adjust the appearance or a displayable feature of the front-facing portion of the rollable display screen. For example, the device selectable controls displayed on the one or more rear-facing portions of the rollable display screen 104 can include a screen brightness control, a device volume control, a screen record control, etc. In response to receiving a touch actuation 126 to a device selectable control on a rear-facing portion of the rollable display screen, the configuration manager 116 can adjust the appearance or a displayable feature of the front-facing portion of the rollable display screen 104.

Any of the devices, applications, modules, servers, and/or services described herein can communicate via a communication network, such as for data communication between the mobile device 102 and other communication and/or computing devices. The communication network can be implemented to include a wired and/or a wireless network, may be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, mobile phone provider, and/or Internet service provider.

In one or more implementations, the mobile device 102 may also be configured in other device form factors 108, such as a partial form factor, which is further shown and described with reference to FIG. 2. As noted above, the partial form factor may also be referred to as a "peek" form factor, and in this configuration, the rollable display screen 104 translates down (e.g., in an opposite direction of the extended display state). This display state provides for an unobstructed sensory view of various device sensors and/or components that are otherwise hidden behind the rollable display screen 104 in both the compact form factor (retracted display state) and expanded form factor (extended display state). For example, device sensors such as a front-facing camera, environment sensors (e.g., for motion, sound, lighting, etc.), a proximity sensor, and/or a phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104, which corresponds to the partial form factor of the mobile device 102. Although generally described throughout this disclosure as the configuration manager 116 initiating and/or automatically controlling the configuration and/or reconfiguration of the mobile device form factors 108, a user of the device may initiate to configure the device in any form factor and/or display state of the rollable display screen, and override configuration settings of the configuration manager.

Figure 2:
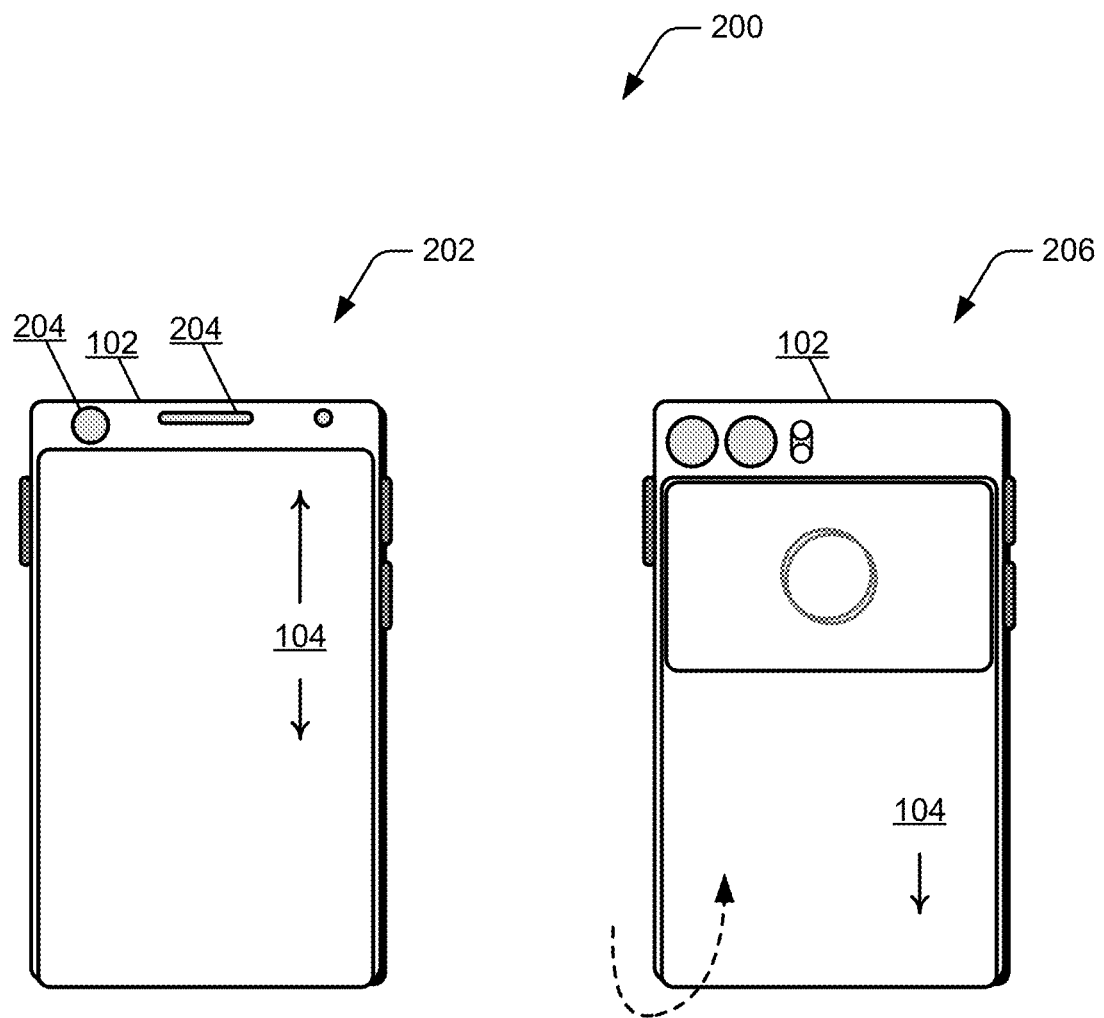
FIG. 2 further illustrates example views of a mobile device, which supports rollable screen simultaneous use in accordance with one or more implementations as described herein.

FIG. 2 further illustrates example views 200 of the mobile device in aspects of rollable screen simultaneous use, as described herein. In these example views 200, the mobile device 102 is shown in a front view 202 in the partial form factor (e.g., also referred to as the "peek" form factor), with the rollable display screen 104 configured in the sensor display state. In this configuration, the rollable display screen 104 translates down (e.g., in an opposite direction of the extended display state). This sensor display state provides for an unobstructed sensory view of various device sensors 204 and/or components that are otherwise hidden behind the rollable display screen 104 in both the compact form factor (retracted display state) and expanded form factor (extended display state). For example, the device sensors 204, such as a front-facing camera, environment sensors (e.g., for motion, sound, lighting, etc.), a proximity sensor, and/or phone earpiece speaker can all be integrated in the mobile device 102 under the rollable display screen 104, and the slidable display mount 114 translates the display screen over or above the sensors. These under-the-display screen sensors are then exposed or visible for use in the sensor display state of the rollable display screen 104 that corresponds to the partial form factor of the mobile device 102. In these example views 200, the mobile device 102 is also shown in a back view 206 in the partial form factor of the device, with the rollable display screen 104 configured in the sensor display state. The rollable display screen 104 is translated by the slidable display mount 114 around the device housing, and forms the rear-facing portion of the display screen.

Figure 3:
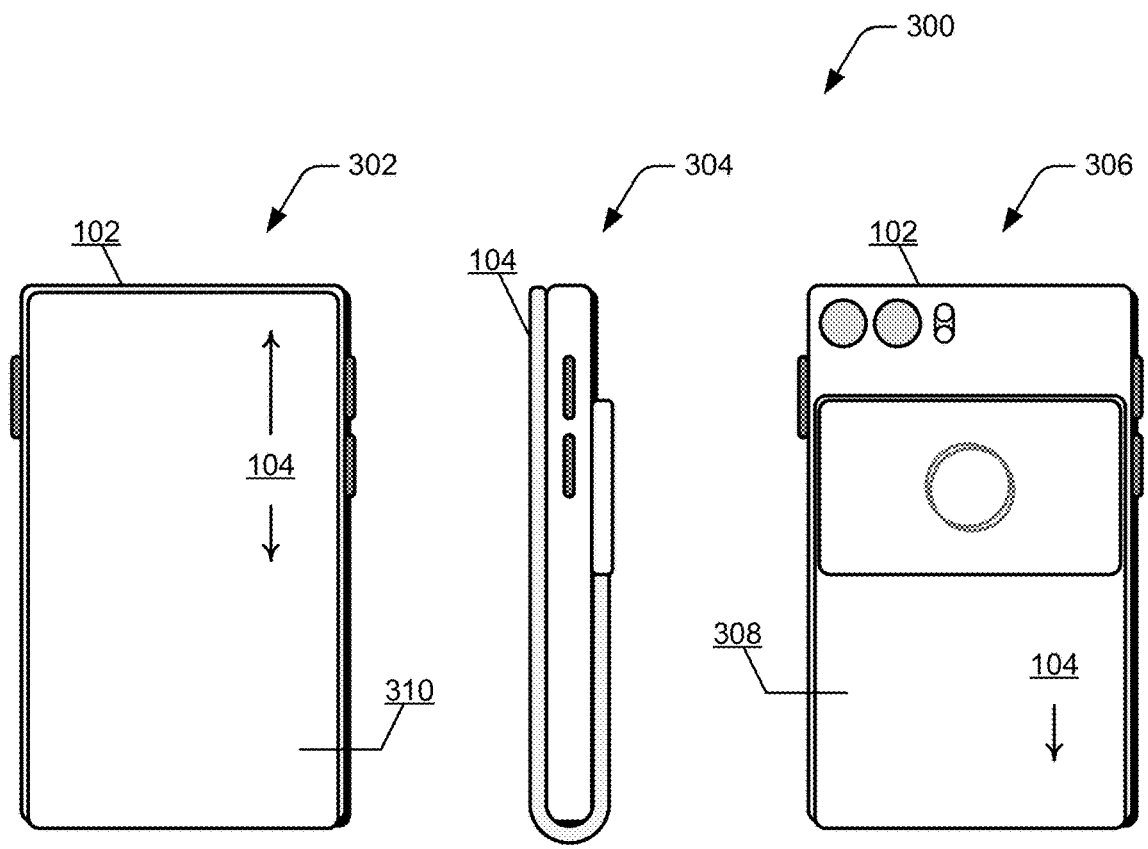
FIG. 3 further illustrates example views of the mobile device, which supports rollable screen simultaneous use in accordance with one or more implementations as described herein.

FIG. 3 further illustrates example views 300 of the mobile device in aspects of rollable screen simultaneous use, as described herein. In these example views 300, the mobile device 102 is shown in a front view 302, a side view 304, and a back view 306 in the compact form factor, with the rollable display screen 104 configured in the retracted display state. In this configuration, a portion of the rollable display screen 104 rotates around the housing of the mobile device 102, forming a rear-facing portion 308 of the display screen (e.g., relative to the front-facing portion 310 of the display screen). In implementations, both the front-facing portion 310 and the rear-facing portion 308 of the rollable display screen 104 can be used to display content, such as related content or content associated with different applications.

Figure 4:
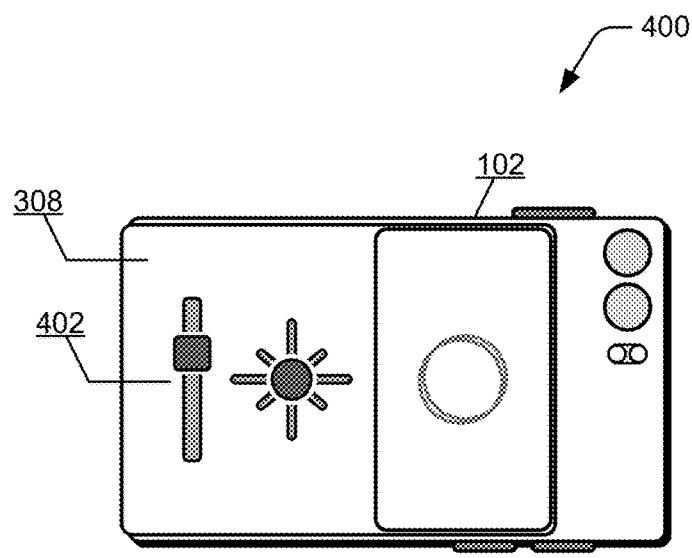
FIG. 4 illustrates an example use scenario of the mobile device, as related to rollable screen simultaneous use in accordance with one or more implementations as described herein.

FIG. 4 illustrates an example use scenario 400 of the mobile device in aspects of rollable screen simultaneous use, as described herein. In this example use scenario 400, the mobile device 102 is shown in a back view in the compact form factor with a selectable control 402 displayed on the rear-facing portion 308 of the rollable display screen 104. In this example, the selectable control 402 is a screen brightness control, such as a device selectable control 124, and the screen brightness control can be actuated by a user of the mobile device, where the user does not need to look at or view the selectable control on the rear-facing portion 308 of the rollable display screen 104 to initiate a touch actuation 126 on the selectable control. In one or more implementations, a selectable control may not be displayed on the rear-facing portion 308 of the rollable display screen 104, yet can still be actuated by a user of the device. For example, if the rear-facing portion 308 of the display screen is not being viewed, then there is not a need to use device power to display the selectable control, yet a user will still be able to actuate the selectable control. Notably, the selectable control 402 may not be displayed on the rear-facing portion 308 of the rollable display screen 104 (or the rear-facing portion of the display screen is not turned on or activated), but the selectable control can still be utilized and is responsive for user touch actuation.

Figure 5:
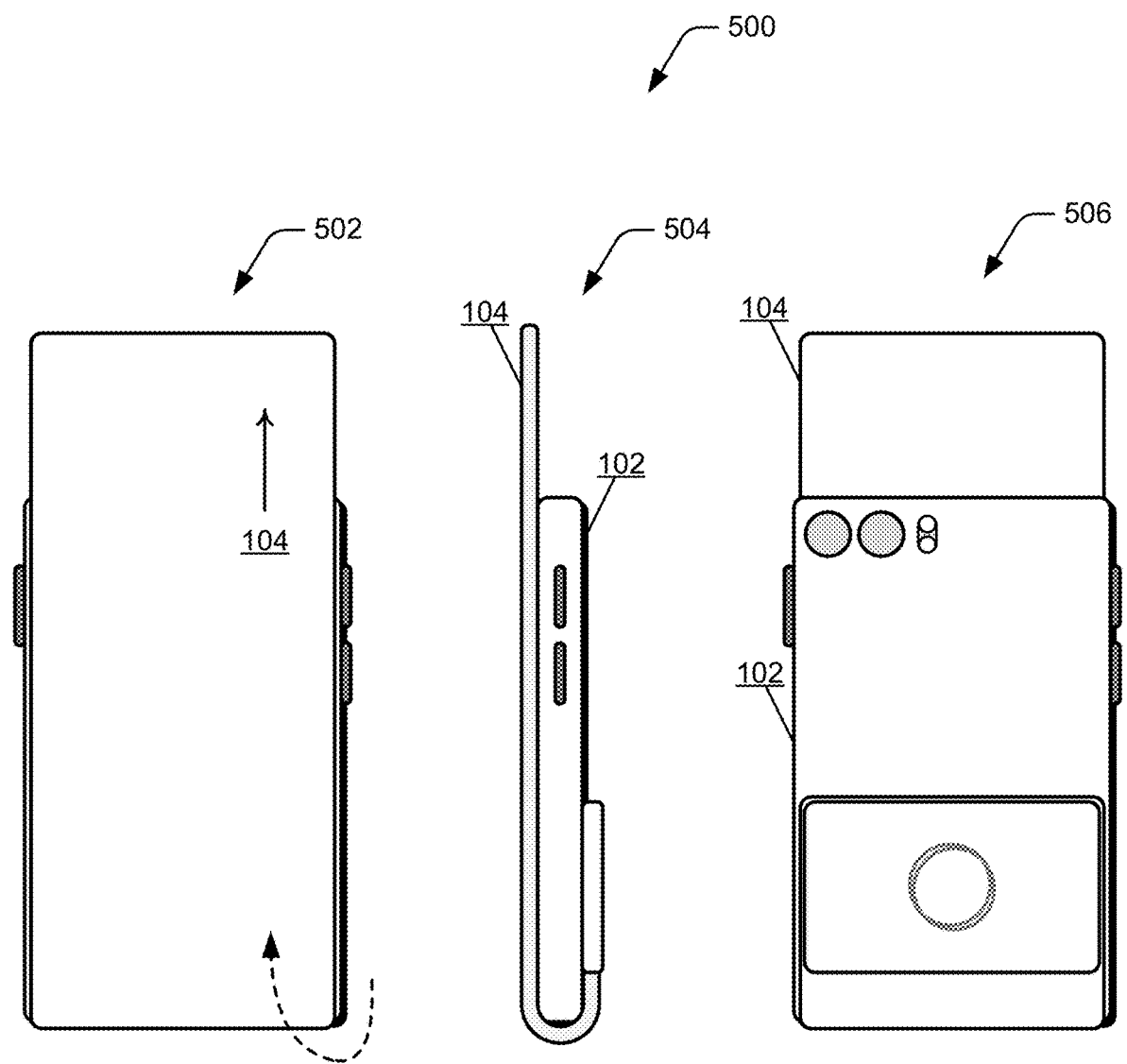
FIG. 5 further illustrates example views of the mobile device, which supports rollable screen simultaneous use in accordance with one or more implementations as described herein.

FIG. 5 further illustrates example views 500 of the mobile device in aspects of rollable screen simultaneous use, as described herein. In these example views 500, the mobile device 102 is shown in a front view 502, a side view 504, and a back view 506 in the expanded form factor, with the rollable display screen 104 configured in the extended display state. In this configuration, a rear-facing portion of the rollable display screen 104 rotates around the device housing and becomes part of the front-facing portion of the display screen. Notably, the viewable display area of the rollable display screen 104 varies as the display screen is translated from the sensor display state to the retracted display state to the extended display state, and back.

As illustrated in the figures, the slidable display mount 114 translates the rollable display screen 104 around the device housing to change the overall length of the flexible display as viewed from the front of the mobile device 102 (e.g., as shown in the front view 502). The slidable display mount 114 also translates the rollable display screen 104 in an opposite direction around the device housing to the retracted display state in the compact form factor of the device, and more of the rollable display screen 104 is viewable as the rear-facing portion of the display. Content, such as any type of graphics and images, can be displayed on any section of the rollable display screen 104, including on the front-facing portion, on the rear-facing portion, and/or on the curved end portion of the display screen.

Figure 6:
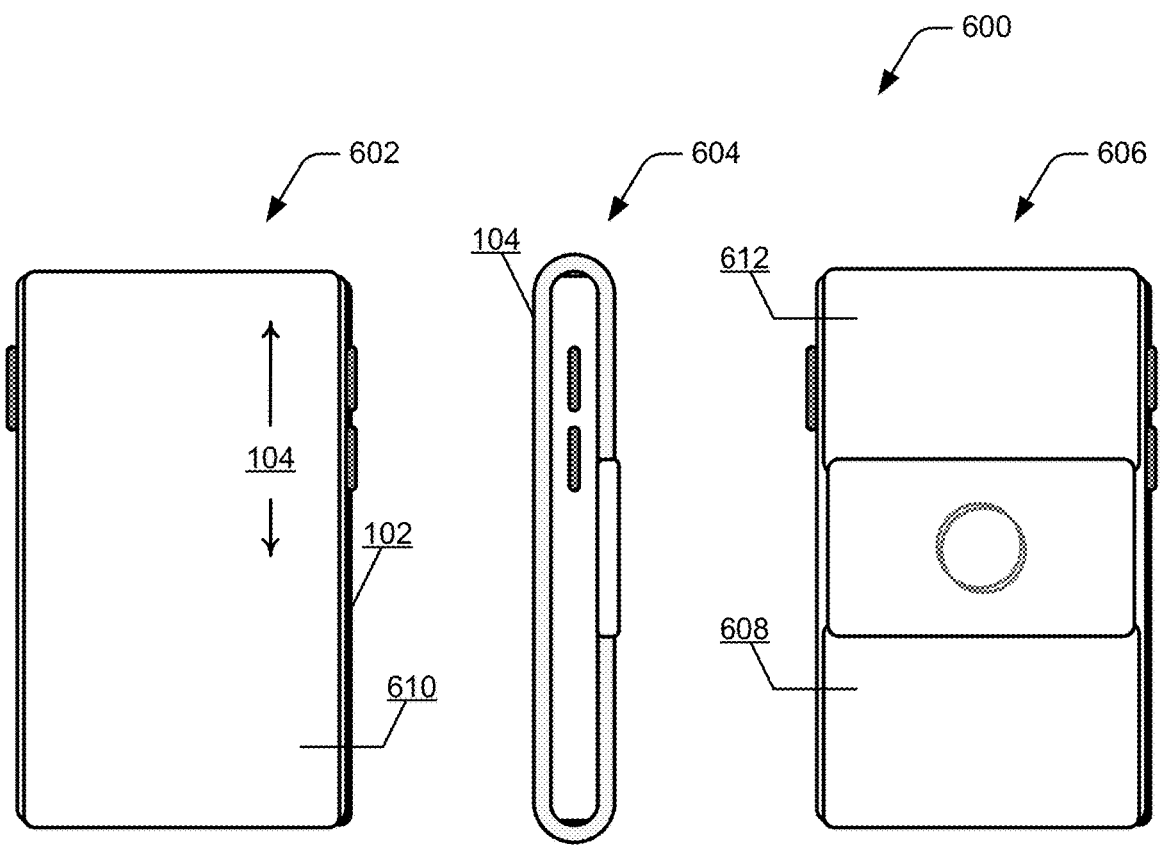
FIG. 6 further illustrates example views of the mobile device, which supports rollable screen simultaneous use in accordance with one or more implementations as described herein.

FIG. 6 further illustrates example views 600 of the mobile device in aspects of rollable screen simultaneous use, as described herein. In these example views 600, the mobile device 102 is shown in a front view 602, a side view 604, and a back view 606 with the rollable display screen 104 configured to wrap around both ends of the mobile device 102. In this configuration, a first portion of the rollable display screen 104 rotates around the housing of the mobile device 102, forming a first rear-facing portion 608 of the display screen (e.g., relative to the front-facing portion 610 of the display screen). Further, a second portion of the rollable display screen 104 rotates around the housing of the mobile device 102, forming a second rear-facing portion 612 of the display screen (e.g., relative to the front-facing portion 610 of the display screen). In implementations, the front-facing portion 610, the first rear-facing portion 608, and the second rear-facing portion 612 of the rollable display screen 104 can be used to display content, such as related content or content associated with different applications.

Figures 7, 8:
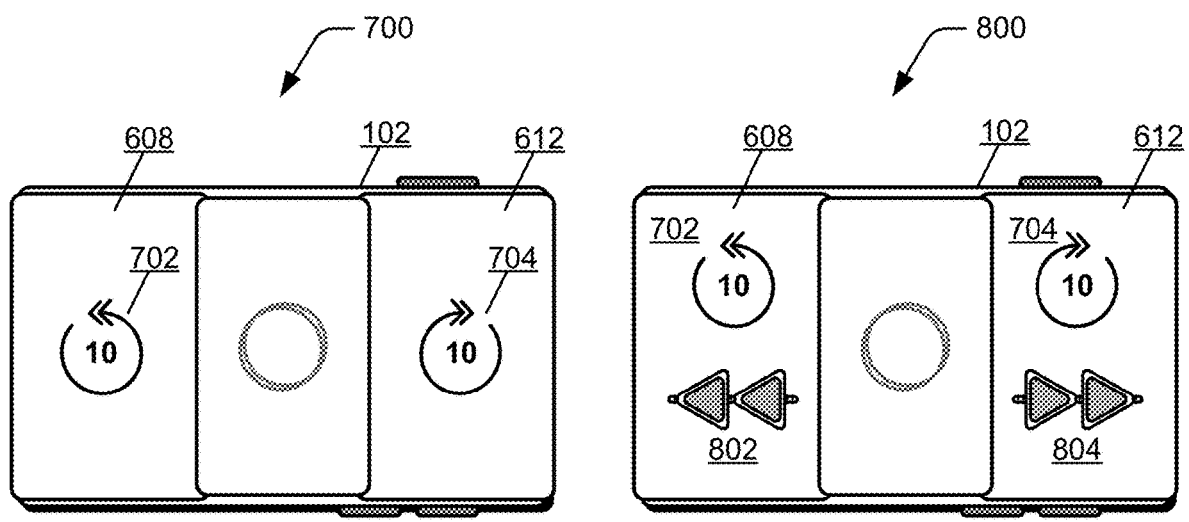
FIG. 7 illustrates an example use scenario of the mobile device, as related to rollable screen simultaneous use in accordance with one or more implementations as described herein.
FIG. 8 illustrates an example use scenario of the mobile device, as related to rollable screen simultaneous use in accordance with one or more implementations as described herein.

FIG. 7 illustrates an example use scenario 700 of the mobile device, as related to rollable screen simultaneous use, as described herein. In this example use scenario 700, the mobile device 102 is shown in a back view with a first selectable control 702 displayed on the first rear-facing portion 608 of the rollable display screen 104, and with a second selectable control 704 displayed on the second rear-facing portion 612 of the rollable display screen 104. In this example, the selectable control 702 is a content skip-back control and the selectable control 704 is a content skip-forward control, both of which are examples of content selectable controls 122. The content skip controls can be actuated by a user of the mobile device, where the user does not need to look at or view the selectable controls on the respective rear-facing portions 608, 612 of the rollable display screen 104 to initiate a touch actuation 126 on either of the selectable controls. In one or more implementations, a selectable control may not be displayed on the rear-facing portions 608, 612 of the rollable display screen 104, yet can still be actuated by a user of the device.

FIG. 8 further illustrates an example use scenario 800 of the mobile device, as related to rollable screen simultaneous use, as described herein. In this example use scenario 800, the mobile device 102 is shown in a back view with multiple selectable controls that a user may actuate on the rear-facing portions of the rollable display screen 104. Notably, any number of the selectable controls can be accessed on the rear-facing portions of the rollable display screen 104. In this example, the selectable controls 702, 704 are displayed on the respective the rear-facing portions 608, 612 of the rollable display screen 104. Additionally, a selectable control 802 is displayed on the first rear-facing portion 608 of the rollable display screen 104, and a selectable control 804 is displayed on the second rear-facing portion 612 of the rollable display screen 104. In this example, the selectable control 802 is a content rewind control and the selectable control 804 is a content advance control, both of which are examples of content selectable controls 122. The content rewind control and the content advance control can be actuated by a user of the mobile device, where the user does not need to look at or view the selectable controls on the respective rear-facing portions 608, 612 of the rollable display screen 104 to initiate a touch actuation 126 on any of the selectable controls.

Figure 9:
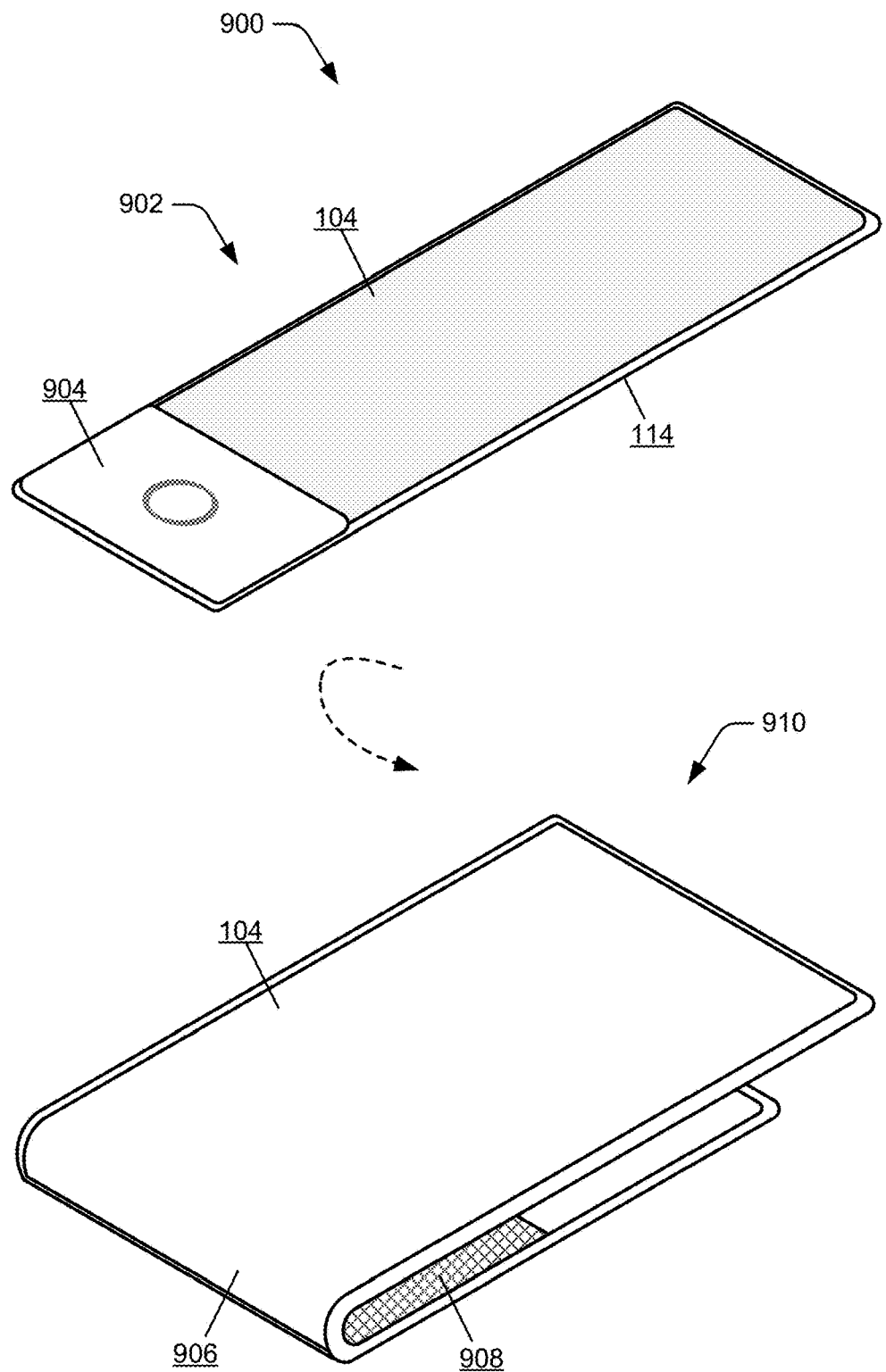
FIG. 9 illustrates example views of a rollable display screen and mounting assembly, which supports rollable screen simultaneous use in accordance with one or more implementations as described herein.

FIG. 9 illustrates example views 900 of the rollable display screen and the slidable display mount of the mobile device in aspects of rollable screen simultaneous use, as described herein. In these example views 900, the rollable display screen 104 integrated with the slidable display mount 114 is shown configured at 902, along with a backplate 904. A display roller mechanism can be implemented to facilitate the flexible display and mounting assembly (e.g., the rollable display screen 104 and the slidable display mount 114) wrapping around the device housing. As described herein, part of the rollable display screen 104 (e.g., a first rear-facing portion of the display screen) can wrap around a first end of mobile device as a continuation of the front-facing portion of the rollable display screen, and another part of the rollable display screen 104 (e.g., a second rear-facing portion of the rollable display screen) can wrap around a second end of the mobile device as a further continuation of the front-facing portion of the rollable display screen.

The display roller mechanism includes a rotor positioned within the curvilinear section 906 of the flexible display and mounting assembly to facilitate translation of the rollable display screen 104 in the various display states. In one or more implementations, the slidable display mount 114 includes a substrate that includes a flexible portion 908, which allows the flexible display and mounting assembly to wrap and deform around the device housing. As shown at 910, the rollable display screen 104 and the slidable display mount 114 are wrapped around to form the curvilinear section 906 of the flexible display, along with two linear sections of the display as the front-facing portion and the rear-facing portion of the rollable display screen. As shown in the example views 900, a cross section of the rollable display screen 104 and the slidable display mount 114 forms a J-shape or U-shape with the curvilinear section 906 of the display.

Example methods 1000, 1100, and 1200 are described with reference to respective FIGS. 10-12 in accordance with one or more implementations for rollable screen simultaneous use, as described herein. Generally, any services, components, modules, managers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
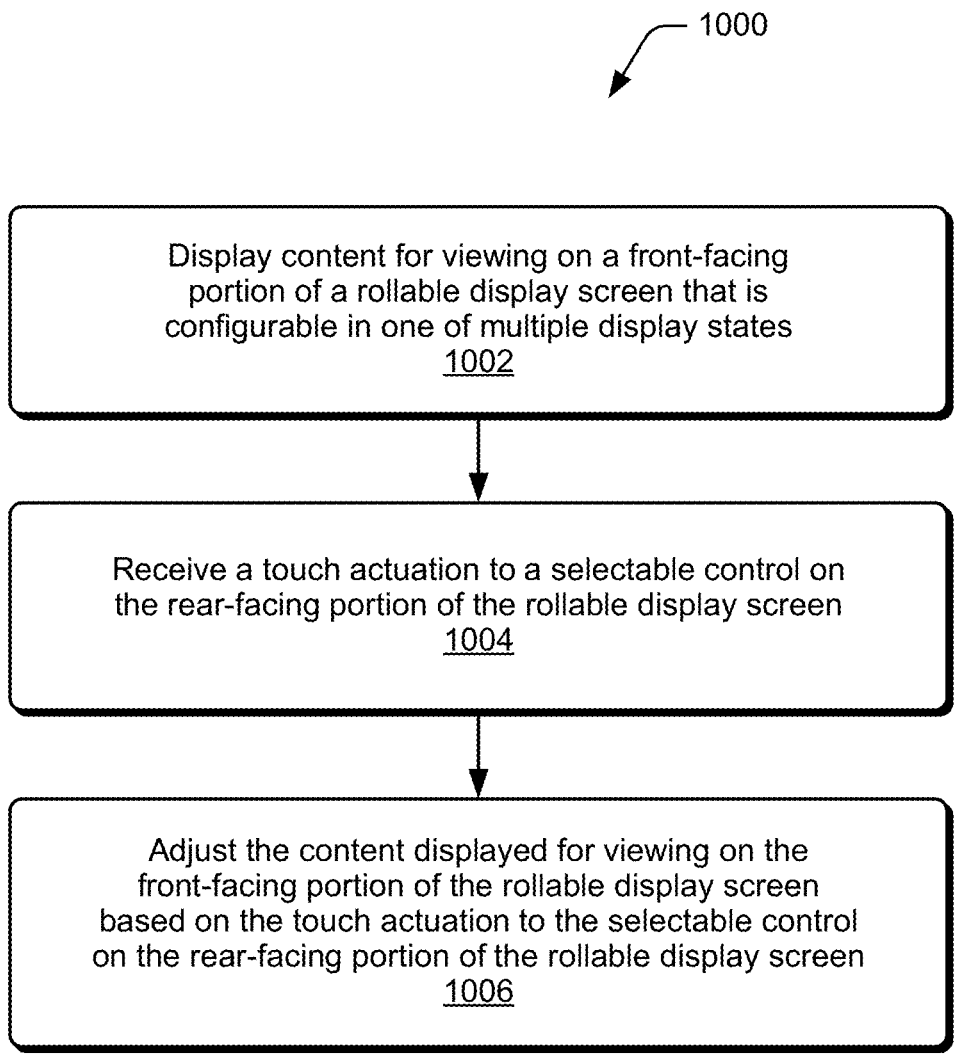
FIGS. 10-12 illustrate example methods for rollable screen simultaneous use in accordance with one or more implementations of the techniques described herein.

FIG. 10 illustrates example method(s) 1000 for rollable screen simultaneous use. The order in which the method is described is not intended to be construed as a limitation, and any number or combination of the described method operations can be performed in any order to perform a method, or an alternate method.

At 1002, content is displayed for viewing on a front-facing portion of a rollable display screen that is configurable in one of multiple display states. For example, the mobile device 102 includes the rollable display screen 104 and the slidable display mount 114 that is operable to extend or retract the rollable display screen. In one or more implementations, the rollable display screen 104 allows for simultaneous utilization of the front-facing portion 610 that is viewable on a first side of a mobile device 102 and the rear-facing portion 608 that is viewable on a second side of the mobile device, such as in at least one of the multiple display states. The rear-facing portion 608 of the rollable display screen 104 wraps around the mobile device as a continuation of the front-facing portion of the rollable display screen. Further, in one or more implementations, the rollable display screen can include a second rear-facing portion 612, where the first rear-facing portion 608 of the rollable display screen 104 wraps around a first end of the mobile device as a continuation of the front-facing portion of the rollable display screen, and the second rear-facing portion 612 of the rollable display screen wraps around a second end of the mobile device as a further continuation of the front-facing portion of the rollable display screen.

At 1004, a touch actuation to a selectable control is received on the rear-facing portion of the rollable display screen. For example, the configuration manager 116 receives a touch actuation 126 to a selectable control (e.g., a content selectable control 122 or a device selectable control 124) on a rear facing portion (e.g., the first rear-facing portion 608 or the second rear-facing portion 612) of the rollable display screen 104. In an implementation, the selectable control can be displayed on one or more of the rear-facing portions of the rollable display screen. Alternatively, the selectable control provides for touch actuation on the rear-facing portion of the rollable display screen, but without the selectable control being displayed. For example, a user of the mobile device does not need to be looking at or viewing the selectable control to initiate a touch actuation on the selectable control. In one or more implementations, the selectable control is a content playback control (e.g., a media playback control, a gaming control), a display control (e.g., a screen brightness control), or a device control (e.g., a device volume control, a screen record control), or any other type of the many possible content playback controls, display controls, and/or device controls.

At 1006, the content displayed for viewing on the front-facing portion of the rollable display screen is adjusted based on the touch actuation to the selectable control on the rear-facing portion of the rollable display screen. For example, the configuration manager initiates to adjust the content displayed for viewing on the front-facing portion 610 of the rollable display screen based on the touch actuation 126 to the selectable control on either of the rear-facing portions 608, 612 of the rollable display screen. In implementations, playback of the content displayed for viewing on the front-facing portion 610 of the rollable display screen 104 is adjusted based on the touch actuation of a content playback control on a rear-facing portion 608, 612 of the rollable display screen. Alternatively, or in addition, an appearance of the front-facing portion 610 of the rollable display screen 104 is adjusted based on the touch actuation of a device display control on a rear-facing portion 608, 612 of the rollable display screen.

Figure 11:
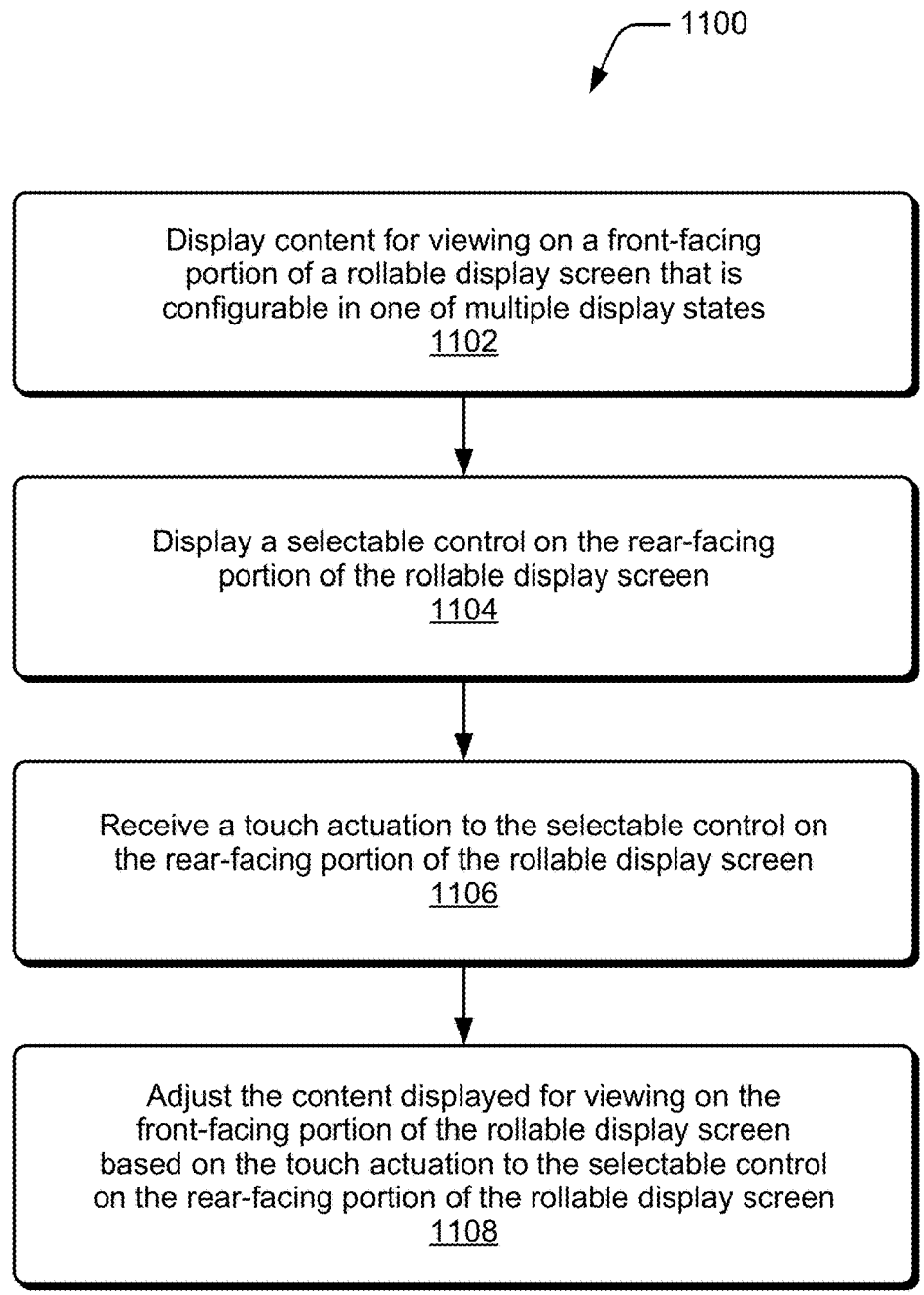

FIG. 11 illustrates example method(s) 1100 for rollable screen simultaneous use. The order in which the method is described is not intended to be construed as a limitation, and any number or combination of the described method operations can be performed in any order to perform a method, or an alternate method.

At 1102, content is displayed for viewing on a front-facing portion of a rollable display screen that is configurable in one of multiple display states. For example, the mobile device 102 includes the rollable display screen 104 and the slidable display mount 114 that is operable to extend or retract the rollable display screen. In one or more implementations, the rollable display screen 104 allows for simultaneous utilization of the front-facing portion 610 that is viewable on a first side of a mobile device 102 and the rear-facing portion 608 that is viewable on a second side of the mobile device, such as in at least one of the multiple display states. The rear-facing portion 608 of the rollable display screen 104 wraps around the mobile device as a continuation of the front-facing portion of the rollable display screen. Further, in one or more implementations, the rollable display screen can include a second rear-facing portion 612, where the first rear-facing portion 608 of the rollable display screen 104 wraps around a first end of the mobile device as a continuation of the front-facing portion of the rollable display screen, and the second rear-facing portion 612 of the rollable display screen wraps around a second end of the mobile device as a further continuation of the front-facing portion of the rollable display screen.

At 1104, a selectable control is displayed on the rear-facing portion of the rollable display screen. For example, a selectable control is displayed on a rear-facing portion 608, 612 of the rollable display screen 104, and the selectable control is a content playback control (e.g., a media playback control, a gaming control), a display control (e.g., a screen brightness control), a device control (e.g., a device volume control, a screen record control), or any other type of the many possible content playback controls, display controls, and/or device controls.

At 1106, a touch actuation to a selectable control is received on the rear-facing portion of the rollable display screen. For example, the configuration manager 116 receives a touch actuation 126 to a selectable control (e.g., a content selectable control 122 or a device selectable control 124) on a rear facing portion (e.g., the first rear-facing portion 608 or the second rear-facing portion 612) of the rollable display screen 104. In an implementation, the selectable control can be displayed on one or more of the rear-facing portions of the rollable display screen. Alternatively, the selectable control provides for touch actuation on the rear-facing portion of the rollable display screen, but without the selectable control being displayed. For example, a user of the mobile device does not need to be looking at or viewing the selectable control to initiate a touch actuation on the selectable control. In one or more implementations, the selectable control is a content playback control (e.g., a media playback control, a gaming control), a display control (e.g., a screen brightness control), or a device control (e.g., a device volume control, a screen record control), or any other type of the many possible content playback controls, display controls, and/or device controls.

At 1108, the content displayed for viewing on the front-facing portion of the rollable display screen is adjusted based on the touch actuation to the selectable control on the rear-facing portion of the rollable display screen. For example, the configuration manager initiates to adjust the content displayed for viewing on the front-facing portion 610 of the rollable display screen based on the touch actuation 126 to the selectable control on either of the rear-facing portions 608, 612 of the rollable display screen. In implementations, playback of the content displayed for viewing on the front-facing portion 610 of the rollable display screen 104 is adjusted based on the touch actuation of a content playback control on a rear-facing portion 608, 612 of the rollable display screen. Alternatively, or in addition, an appearance of the front-facing portion 610 of the rollable display screen 104 is adjusted based on the touch actuation of a device display control on a rear-facing portion 608, 612 of the rollable display screen.

Figure 12:
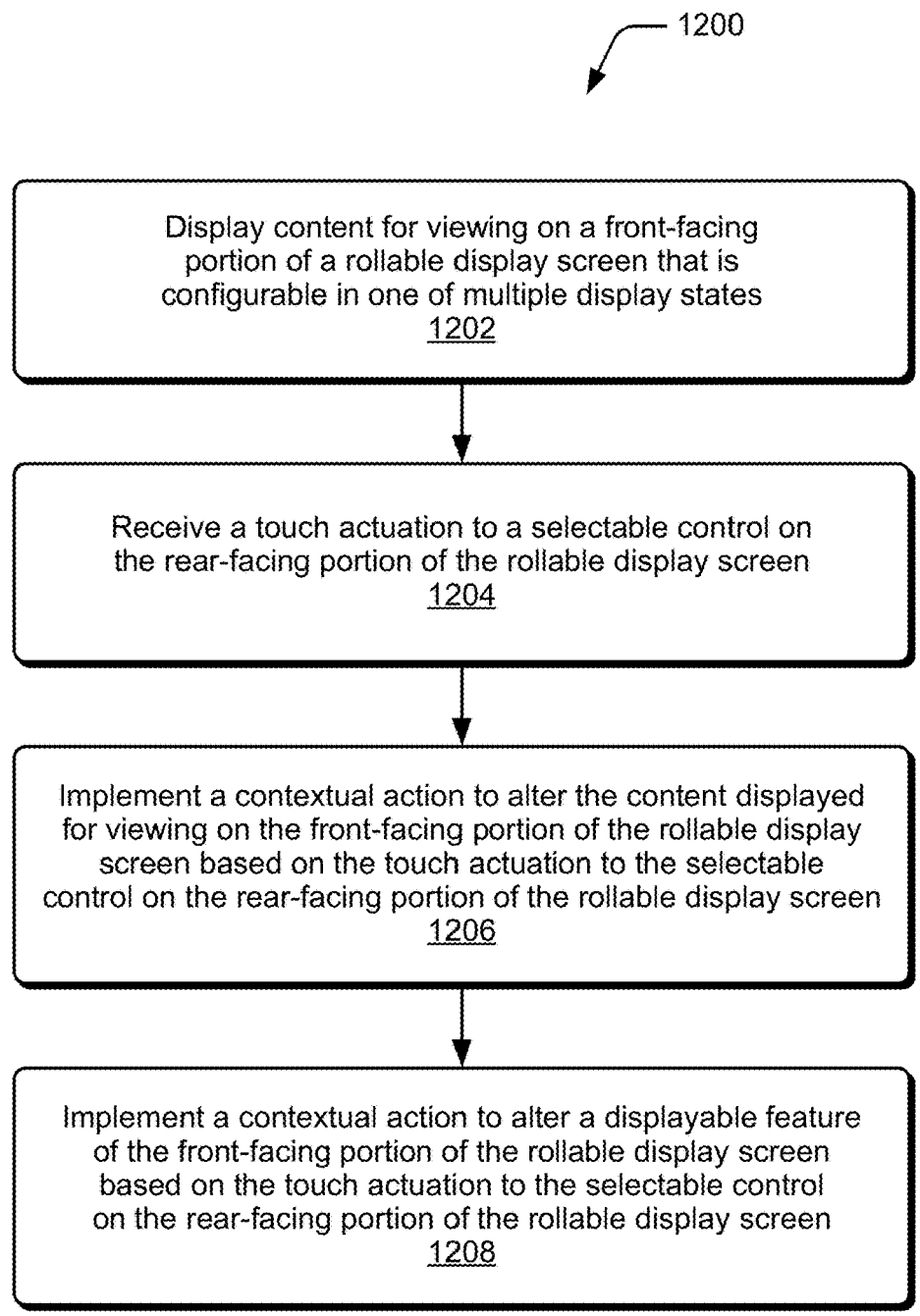

FIG. 12 illustrates example method(s) 1200 for rollable screen simultaneous use. The order in which the method is described is not intended to be construed as a limitation, and any number or combination of the described method operations can be performed in any order to perform a method, or an alternate method.

At 1202, content is displayed for viewing on a front-facing portion of a rollable display screen that is configurable in one of multiple display states. For example, the mobile device 102 includes the rollable display screen 104 and the slidable display mount 114 that is operable to extend or retract the rollable display screen. In one or more implementations, the rollable display screen 104 allows for simultaneous utilization of the front-facing portion 610 that is viewable on a first side of a mobile device 102 and the rear-facing portion 608 that is viewable on a second side of the mobile device, such as in at least one of the multiple display states. The rear-facing portion 608 of the rollable display screen 104 wraps around the mobile device as a continuation of the front-facing portion of the rollable display screen. Further, in one or more implementations, the rollable display screen can include a second rear-facing portion 612, where the first rear-facing portion 608 of the rollable display screen 104 wraps around a first end of the mobile device as a continuation of the front-facing portion of the rollable display screen, and the second rear-facing portion 612 of the rollable display screen wraps around a second end of the mobile device as a further continuation of the front-facing portion of the rollable display screen.

At 1204, a touch actuation to a selectable control is received on the rear-facing portion of the rollable display screen. For example, the configuration manager 116 receives a touch actuation 126 to a selectable control (e.g., a content selectable control 122 or a device selectable control 124) on a rear facing portion (e.g., the first rear-facing portion 608 or the second rear-facing portion 612) of the rollable display screen 104. In an implementation, the selectable control can be displayed on one or more of the rear-facing portions of the rollable display screen. Alternatively, the selectable control provides for touch actuation on the rear-facing portion of the rollable display screen, but without the selectable control being displayed. For example, a user of the mobile device does not need to be looking at or viewing the selectable control to initiate a touch actuation on the selectable control. In one or more implementations, the selectable control is a content playback control (e.g., a media playback control, a gaming control), a display control (e.g., a screen brightness control), or a device control (e.g., a device volume control, a screen record control), or any other type of the many possible content playback controls, display controls, and/or device controls.

At 1206, a contextual action is implemented to alter the content displayed for viewing on the front-facing portion of the rollable display screen based on the touch actuation to the selectable control on the rear-facing portion of the rollable display screen. For example, the configuration manager 116 implements a contextual action to alter the content displayed for viewing on the front-facing portion 610 of the rollable display screen 104 based on a touch actuation 126 to a selectable control (e.g., a content selectable control 122) on a rear-facing portion 608, 612 of the rollable display screen. In implementations, playback of the content displayed for viewing on the front-facing portion 610 of the rollable display screen 104 is adjusted based on the touch actuation of a content playback control on a rear-facing portion of the rollable display screen.

At 1208, a contextual action is implemented to alter a displayable feature of the front-facing portion of the rollable display screen based on the touch actuation to the selectable control on the rear-facing portion of the rollable display screen. For example, the configuration manager 116 implements a contextual action to alter a displayable feature of the front-facing portion 610 of the rollable display screen 104 based on the touch actuation to a selectable control (e.g., a device selectable control 124) on a rear-facing portion 608, 612 of the rollable display screen. In implementations, an appearance of the front-facing portion 610 of the rollable display screen 104 is adjusted based on the touch actuation of a display control on a rear-facing portion of the rollable display screen.

Figure 13:
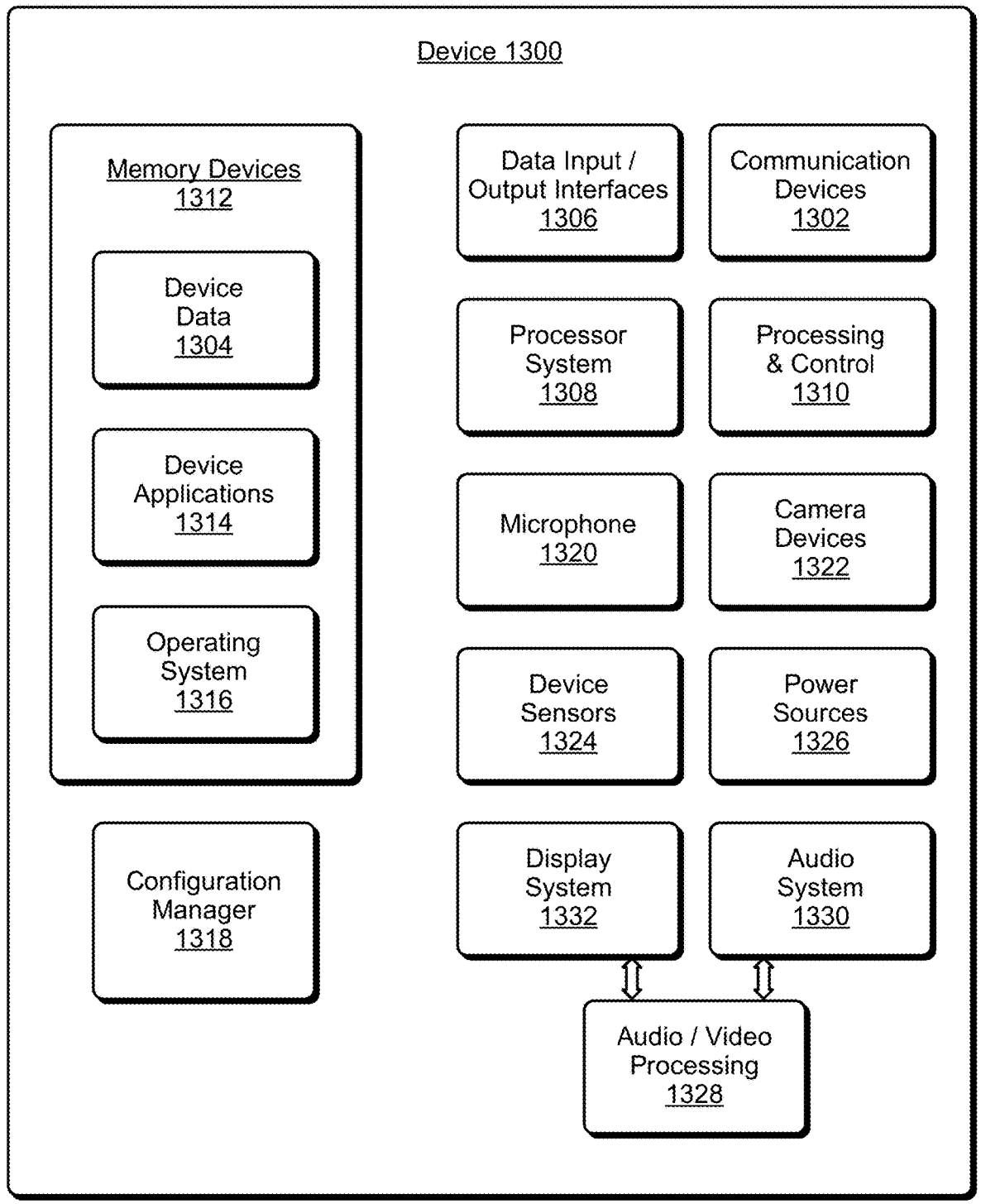
FIG. 13 illustrates various components of an example device that can be used to implement the techniques for rollable screen simultaneous use as described herein.

FIG. 13 illustrates various components of an example device 1300, which can implement aspects of the techniques and features for rollable screen simultaneous use, as described herein. The example device 1300 can be implemented as any of the devices described with reference to the previous FIGS. 1-12, such as any type of a wireless device, mobile device, mobile phone, flip phone, client device, companion device, paired device, display device, tablet, computing, communication, entertainment, gaming, media playback, and/or any other type of computing and/or electronic device. For example, the mobile device 102 described with reference to FIGS. 1-12 may be implemented as the example device 1300.

The example device 1300 can include various, different communication devices 1302 that enable wired and/or wireless communication of device data 1304 with other devices. The device data 1304 can include any of the various devices data and content that is generated, processed, determined, received, stored, and/or communicated from one computing device to another. Generally, the device data 1304 can include any form of audio, video, image, graphics, and/or electronic data that is generated by applications executing on a device. The communication devices 1302 can also include transceivers for cellular phone communication and/or for any type of network data communication.

The example device 1300 can also include various, different types of data input/output (I/O) interfaces 1306, such as data network interfaces that provide connection and/or communication links between the devices, data networks, and other devices. The I/O interfaces 1306 can be used to couple the device to any type of components, peripherals, and/or accessory devices, such as a computer input device that may be integrated with the example device 1300. The I/O interfaces 1306 may also include data input ports via which any type of data, information, media content, communications, messages, and/or inputs can be received, such as user inputs to the device, as well as any type of audio, video, image, graphics, and/or electronic data received from any content and/or data source.

The example device 1300 includes a processor system 1308 of one or more processors (e.g., any of microprocessors, controllers, and the like) and/or a processor and memory system implemented as a system-on-chip (SoC) that processes computer-executable instructions. The processor system 1308 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1310. The example device 1300 may also include any type of a system bus or other data and command transfer system that couples the various components within the device. A system bus can include any one or combination of different bus structures and architectures, as well as control and data lines.

The example device 1300 also includes memory and/or memory devices 1312 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1312 include volatile memory and non-volatile memory, fixed and removable media devices, and any suitable memory device or electronic data storage that maintains data for computing device access. The memory devices 1312 can include various implementations of random-access memory (RAM), read-only memory (ROM), flash memory, and other types of storage media in various memory device configurations. The example device 1300 may also include a mass storage media device.

The memory devices 1312 (e.g., as computer-readable storage memory) provide data storage mechanisms, such as to store the device data 1304, other types of information and/or electronic data, and various device applications 1314 (e.g., software applications and/or modules). For example, an operating system 1316 can be maintained as software instructions with a memory device 1312 and executed by the processor system 1308 as a software application. The device applications 1314 may also include a device manager, such as any form of a control application, software application, signal-processing and control module, code that is specific to a particular device, a hardware abstraction layer for a particular device, and so on.

In this example, the device 1300 includes a configuration manager 1318 that implements various aspects of the described features and techniques described herein. The configuration manager 1318 can be implemented with hardware components and/or in software as one of the device applications 1314, such as when the example device 1300 is implemented as the mobile device 102 described with reference to FIGS. 1-12. An example of the configuration manager 1318 is the configuration manager 116 implemented in the mobile device 102, such as a software application and/or as hardware components in the wireless device. In implementations, the configuration manager 1318 may include independent processing, memory, and logic components as a computing and/or electronic device integrated with the example device 1300.

The example device 1300 can also include a microphone 1320 and/or camera devices 1322, as well as device sensors 1324, including proximity sensors and/or motion sensors, such as may be implemented as components of an inertial measurement unit (IMU). The device sensors 1324 can be implemented with various motion sensors, such as a gyroscope, an accelerometer, and/or other types of motion sensors to sense motion of the device. The motion sensors can generate sensor data vectors having three-dimensional parameters (e.g., rotational vectors in x, y, and z-axis coordinates) indicating location, position, acceleration, rotational speed, and/or orientation of the device. The example device 1300 can also include one or more power sources 1326, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 1300 can also include an audio and/or video processing system 1328 that generates audio data for an audio system 1330 and/or generates display data for a display system 1332. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1300. Alternatively, the audio system and/or the display system are external, peripheral components to the example device.

Although implementations of rollable screen simultaneous use have been described in language specific to features and/or methods, the appended claims are not necessarily limited to the specific features or methods described. Rather, the specific features and methods are disclosed as example implementations of rollable screen simultaneous use, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A mobile device, comprising a rollable display screen configurable in one of multiple display states, including a front-facing portion of the rollable display screen and at least one rear-facing portion of the rollable display screen; and a configuration manager implemented at least partially in computer hardware and configured to adjust content displayed for viewing on the front-facing portion of the rollable display screen based at least in part on a touch actuation to a selectable control on the at least one rear-facing portion of the rollable display screen.

Alternatively or in addition to the above described mobile device, any one or combination of: the selectable control is displayable on the at least one rear-facing portion of the rollable display screen and configured for the touch actuation. The selectable control is configured for the touch actuation on the at least one rear-facing portion of the rollable display screen without being displayed. Wherein responsive to the touch actuation to the selectable control on the at least one rear-facing portion of the rollable display screen, the configuration manager is configured to implement a contextual action to alter at least one of the content or a displayable feature of the front-facing portion of the rollable display screen. The rollable display screen is configured for simultaneous utilization of the front-facing portion that is viewable on a first side of the mobile device and the at least one rear-facing portion that is viewable on a second side of the mobile device in at least one of the multiple display states. The at least one rear-facing portion of the rollable display screen wraps around the mobile device as a continuation of the front-facing portion of the rollable display screen. The mobile device further comprising a second rear-facing portion of the rollable display screen, wherein the at least one rear-facing portion of the rollable display screen wraps around a first end of the mobile device as a continuation of the front-facing portion of the rollable display screen, and the second rear-facing portion of the rollable display screen wraps around a second end of the mobile device as a further continuation of the front-facing portion of the rollable display screen. The selectable control is a content playback control, and the configuration manager is configured to adjust playback of the content displayed for viewing on the front-facing portion of the rollable display screen based on the touch actuation of the content playback control on the at least one rear-facing portion of the rollable display screen. The selectable control is a display control, and the configuration manager is configured to adjust an appearance of the front-facing portion of the rollable display screen based on the touch actuation of the display control on the at least one rear-facing portion of the rollable display screen.

A method, comprising displaying content for viewing on a front-facing portion of a rollable display screen that is configurable in one of multiple display states; receiving a touch actuation to a selectable control on at least one rear-facing portion of the rollable display screen; and adjusting the content displayed for viewing on the front-facing portion of the rollable display screen based at least in part on the touch actuation to the selectable control on the at least one rear-facing portion of the rollable display screen.

Alternatively or in addition to the above described system, any one or combination of: the method further comprising displaying the selectable control on the at least one rear-facing portion of the rollable display screen. The selectable control is configured for the touch actuation on the at least one rear-facing portion of the rollable display screen without being displayed. The method further comprising implementing a contextual action to alter at least one of the content or a displayable feature of the front-facing portion of the rollable display screen based on the receiving the touch actuation to the selectable control on the at least one rear-facing portion of the rollable display screen. The rollable display screen is configured for simultaneous utilization of the front-facing portion that is viewable on a first side of a mobile device and the at least one rear-facing portion that is viewable on a second side of the mobile device in at least one of the multiple display states. The at least one rear-facing portion of the rollable display screen wraps around the mobile device as a continuation of the front-facing portion of the rollable display screen. The rollable display screen includes a second rear-facing portion; the at least one rear-facing portion of the rollable display screen wraps around a first end of the mobile device as a continuation of the front-facing portion of the rollable display screen; and the second rear-facing portion of the rollable display screen wraps around a second end of the mobile device as a further continuation of the front-facing portion of the rollable display screen. The selectable control is a content playback control, and playback of the content displayed for viewing on the front-facing portion of the rollable display screen is adjusted based on the touch actuation of the content playback control on the at least one rear-facing portion of the rollable display screen. The method further comprising the selectable control is a display control, and an appearance of the front-facing portion of the rollable display screen is adjusted based on the touch actuation of the display control on the at least one rear-facing portion of the rollable display screen.

A mobile device, comprising a rollable display screen configurable in one of multiple display states, including a front-facing portion of the rollable display screen, a first rear-facing portion of the rollable display screen, and a second rear-facing portion of the rollable display screen; and a configuration manager implemented at least partially in computer hardware and configured to adjust content displayed for viewing on the front-facing portion of the rollable display screen based at least in part on a touch actuation to at least one of a first selectable control on the first rear-facing portion of the rollable display screen or a second selectable control on the second rear-facing portion of the rollable display screen.

Alternatively or in addition to the above described system: wherein responsive to the touch actuation to the first selectable control on the first rear-facing portion of the rollable display screen or the second selectable control on the second rear-facing portion of the rollable display screen, the configuration manager is configured to implement a contextual action to alter at least one of the content or a displayable feature of the front-facing portion of the rollable display screen.

The invention claimed is:

1. A mobile device, comprising:
a rollable display screen configurable in one of multiple display states, including a front-facing portion of the rollable display screen and at least one rear-facing portion of the rollable display screen; and
a configuration manager implemented at least partially in computer hardware and configured to:
determine a display state of the rollable display screen, including a configuration of an expanded increment of the front-facing portion of the rollable display screen and the at least one rear-facing portion of the rollable display screen; and
adjust content displayed for viewing on the front-facing portion of the rollable display screen based at least in part on the display state and on a touch actuation to a selectable control on the at least one rear-facing portion of the rollable display screen.

2. The mobile device of claim 1, wherein the selectable control is displayable on the at least one rear-facing portion of the rollable display screen and configured for the touch actuation.

3. The mobile device of claim 1, wherein the selectable control is configured for the touch actuation on the at least one rear-facing portion of the rollable display screen without being displayed.

4. The mobile device of claim 1, wherein responsive to the touch actuation to the selectable control on the at least one rear-facing portion of the rollable display screen, the configuration manager is configured to implement a contextual action to alter at least one of the content or a displayable feature of the front-facing portion of the rollable display screen.

5. The mobile device of claim 1, wherein the rollable display screen is configured for simultaneous utilization of the front-facing portion that is viewable on a first side of the mobile device and the at least one rear-facing portion that is viewable on a second side of the mobile device in at least one of the multiple display states.

6. The mobile device of claim 1, wherein the at least one rear-facing portion of the rollable display screen wraps around the mobile device as a continuation of the front-facing portion of the rollable display screen.

7. The mobile device of claim 1, further comprising a second rear-facing portion of the rollable display screen, wherein the at least one rear-facing portion of the rollable display screen wraps around a first end of the mobile device as a continuation of the front-facing portion of the rollable display screen, and the second rear-facing portion of the rollable display screen wraps around a second end of the mobile device as a further continuation of the front-facing portion of the rollable display screen.

8. The mobile device of claim 1, wherein the selectable control is a content playback control, and the configuration manager is configured to adjust playback of the content displayed for viewing on the front-facing portion of the rollable display screen based on the touch actuation of the content playback control on the at least one rear-facing portion of the rollable display screen.

9. The mobile device of claim 1, wherein the selectable control is a display control, and the configuration manager is configured to adjust an appearance of the front-facing portion of the rollable display screen based on the touch actuation of the display control on the at least one rear-facing portion of the rollable display screen.

10. The mobile device of claim 1, wherein the configuration manager is configured to automatically extend or retract the rollable display screen in response to the touch actuation to the selectable control.

11. A method, comprising:
displaying content for viewing on a front-facing portion of a rollable display screen that is configurable in one of multiple display states;
receiving a touch actuation to a selectable control on at least one rear-facing portion of the rollable display screen;
determining a display state of the rollable display screen, including a configuration of an expanded increment of the front-facing portion of the rollable display screen and the at least one rear-facing portion of the rollable display screen; and
adjusting the content displayed for viewing on the front-facing portion of the rollable display screen based at least in part on the display state and on the touch actuation to the selectable control on the at least one rear-facing portion of the rollable display screen.

12. The method of claim 11, further comprising:
displaying the selectable control on the at least one rear-facing portion of the rollable display screen.

13. The method of claim 11, wherein the selectable control is configured for the touch actuation on the at least one rear-facing portion of the rollable display screen without being displayed.

14. The method of claim 11, further comprising:
implementing a contextual action to alter at least one of the content or a displayable feature of the front-facing portion of the rollable display screen based on the receiving the touch actuation to the selectable control on the at least one rear-facing portion of the rollable display screen.

15. The method of claim 11, wherein the rollable display screen is configured for simultaneous utilization of the front-facing portion that is viewable on a first side of a mobile device and the at least one rear-facing portion that is viewable on a second side of the mobile device in at least one of the multiple display states.

16. The method of claim 15, wherein the at least one rear-facing portion of the rollable display screen wraps around the mobile device as a continuation of the front-facing portion of the rollable display screen.

17. The method of claim 15, wherein:
the rollable display screen includes a second rear-facing portion;
the at least one rear-facing portion of the rollable display screen wraps around a first end of the mobile device as a continuation of the front-facing portion of the rollable display screen; and
the second rear-facing portion of the rollable display screen wraps around a second end of the mobile device as a further continuation of the front-facing portion of the rollable display screen.

18. The method of claim 11, further comprising:
the selectable control is a display control, and an appearance of the front-facing portion of the rollable display screen is adjusted based on the touch actuation of the display control on the at least one rear-facing portion of the rollable display screen.

19. A mobile device, comprising:
a rollable display screen configurable in one of multiple display states, including a front-facing portion of the rollable display screen, a first rear-facing portion of the rollable display screen, and a second rear-facing portion of the rollable display screen; and
a configuration manager implemented at least partially in computer hardware and configured to:
determine a display state of the rollable display screen, including a configuration of an expanded increment of the front-facing portion of the rollable display screen and the first rear-facing portion of the rollable display screen or the second rear-facing portion of the rollable display screen; and
adjust content displayed for viewing on the front-facing portion of the rollable display screen based at least in part on the display state and on a touch actuation to at least one of a first selectable control on the first rear-facing portion of the rollable display screen or a second selectable control on the second rear-facing portion of the rollable display screen.

20. The mobile device of claim 19, wherein responsive to the touch actuation to the first selectable control on the first rear-facing portion of the rollable display screen or the second selectable control on the second rear-facing portion of the rollable display screen, the configuration manager is configured to implement a contextual action to alter at least one of the content or a displayable feature of the front-facing portion of the rollable display screen.

\* \* \* \* \*